US012723980B2

(12) United States Patent
Gunther et al.

(10) Patent No.: US 12,723,980 B2
(45) Date of Patent: Sep. 1, 2026

(54) MICROSPOT REFLECTOMETER

(71) Applicant: The Boeing Company, Arlington, VA (US)

(72) Inventors: Brian Gunther, St. Louis, MO (US); James Thaddeus Wegner, St. Louis, MO (US); Jeffery Thomas Murphy, Troy, MO (US)

(73) Assignee: THE BOEING COMPANY, Arlington, VA (US)

( * ) Notice: Subject to any disclaimer, the term of this patent is extended or adjusted under 35 U.S.C. 154(b) by 182 days.

(21) Appl. No.: 18/301,486

(22) Filed: Apr. 17, 2023

(65) Prior Publication Data

US 2024/0344980 A1 Oct. 17, 2024

(51) Int. Cl.
*G01N 21/55* (2014.01)
*G02B 26/08* (2006.01)

(52) U.S. Cl.
CPC ......... *G01N 21/55* (2013.01); *G02B 26/0816* (2013.01); *G01N 2201/021* (2013.01); *G01N 2201/06113* (2013.01); *G01N 2201/0633* (2013.01); *G01N 2201/0637* (2013.01)

(58) Field of Classification Search
CPC ............. G01N 21/55; G01N 2201/021; G01N 2201/06113; G01N 2201/0633; G01N 2201/0637; G01N 21/21; G01N 2021/399; G01N 2021/8845; G01N 2021/8848; G01N 21/31; G02B 26/0816
See application file for complete search history.

(56) References Cited

U.S. PATENT DOCUMENTS 4,847,184 A * 7/1989 Taniguchi ................ B27M 1/06 347/225
6,181,427 B1 * 1/2001 Yarussi .................. G01N 21/55 356/328
6,603,542 B1 8/2003 Chase et al.
7,755,775 B1 * 7/2010 Li ........................ G01N 21/956 356/625
9,903,811 B2 2/2018 Jungwirth
10,697,893 B2 6/2020 Shawgo et al.
2003/0012333 A1 * 1/2003 Schultz .................... G21K 5/00 378/34
2003/0076497 A1 * 4/2003 Wolf .................. G01N 21/1702 356/369
2004/0195511 A1 * 10/2004 Elmore ............. G01N 21/3563 250/339.02

(Continued)

OTHER PUBLICATIONS

Acrome, "Stewart Platform 6-DoF sophisticated motion system for robotics and controls", retrieved from the internet: https://acrome.net/product/stewart-platform [retrieved on Mar. 10, 2023], pp. 1-7.

(Continued)

*Primary Examiner* — Jennifer D Bennett
(74) *Attorney, Agent, or Firm* — COATS & BENNETT, PLLC

(57) ABSTRACT

A reflectometer configured to test a sample. The reflectometer includes a light source that emits a light beam to the sample that is placed on a sample holder. The reflectometer focuses the light beam to a reduced spot size on the sample. The reflectometer is configured to view structure/defects in the sample using a detector that is downstream from the sample.

20 Claims, 9 Drawing Sheets

(56) References Cited

U.S. PATENT DOCUMENTS

| | | | | |
|---|---|---|---|---|
| 2006/0192958 | A1* | 8/2006 | Harrison | G01J 3/0232 250/372 |
| 2006/0250610 | A1* | 11/2006 | Meeks | G01B 11/306 356/237.2 |
| 2014/0375981 | A1* | 12/2014 | Wang | G01N 21/956 356/51 |
| 2016/0322785 | A1 | 11/2016 | Tilton et al. | |
| 2019/0117109 | A1* | 4/2019 | Grundfest | A61B 5/4875 |
| 2021/0131786 | A1 | 5/2021 | Zhao | |
| 2021/0356395 | A1 | 11/2021 | Shawgo et al. | |

OTHER PUBLICATIONS

EP Search Report mailed Sep. 9, 2024 in re EP Application No. 24159364.9.

* cited by examiner

MICROSPOT REFLECTOMETER

TECHNOLOGICAL FIELD

The present disclosure relates generally to the field of testing a sample and, more specifically, to a reflectometer with optical elements configured to direct light to a sample and a detector.

BACKGROUND

Specular reflectance refers to the reflection of light from a surface, such as a mirror, in which light from an incoming direction is reflected into an outgoing direction. Thus, specular reflectance is a behavior of light which can be measured using optical equipment. Specular reflectance measurement of materials is one way of determining the composition or other chemical, thermal or optical characteristics of the sample material.

Measurement of specular reflectance has several applications. For example, this technique is used to establish reference standards for other types of reflectance measurements and for calibration of optical measurement devices. In another example, this technique is used in the optical coating industry to develop coatings, for example, mirrors in order to increase the mirror's optical efficiency. In still another example, precise absolute measurement of specular reflectance can be used to measure the thickness or refractive index of a single layer of an optical coating.

Specular reflectance measurement devices have difficulty in aligning the components and the sample for accurate measurement. Additionally, specular reflectance measurement devices have difficulty focusing the light beam at the sample and at the detector. For example, the light beams tend to disperse along the length of the light beam. Improved techniques for measuring absolute specular reflectance are desirable. For example, devices having enhanced alignment mechanisms and techniques for the components and the sample for improved reflectance measurements are desirable. Devices having focused light paths and spot size on the sample are desirable.

SUMMARY

One aspect is directed to a reflectometer configured to test a sample. The reflectometer comprises a plurality of light sources with each of the light sources configured to emit a light beam along a light path at a different wavelength. A sample holder is configured to position the sample along the light path. A mirror system is positioned in the light path between the light source and the sample holder and is configured to reflect the light beam from the light source towards the sample. A detector is positioned downstream from the sample holder to receive the light beam that is reflected from the sample. The mirror system comprises a first mirror and a second mirror downstream from the first mirror. The first mirror is configured to be adjustable relative to the plurality of light sources. For each light source, the first mirror is configured to move between a first angular position that forms a first polarization path with a first polarization state and a second angular position that forms a different second polarization path with a different second polarization state. The second mirror is configured to be adjustable to receive the light beam along each of the first polarization path and the second polarization path and direct the light beam along a common path downstream from the second mirror.

In another aspect, a first periscope is positioned along the first polarization path with the first periscope configured to provide the light beam with the first polarization state, and a second periscope is positioned along the second polarization path with the second periscope configured to provide the light beam with the second polarization state.

In another aspect, the first periscope is configured to change the polarization of the light beam to the first polarization state and the second periscope is configured to change the polarization of the light beam to the second polarization state.

In another aspect, the plurality of light sources comprises a first laser that emits the light beam at a first wavelength and a second laser that emits the light beam at a different second wavelength.

In another aspect, each of the plurality of light sources has a unique position such that the light path to the first mirror is different for each of the light sources.

In another aspect, the mirror system comprises: an expanding mirror that receives the light beam from the second mirror; a collimating mirror that receives the light beam from the expanding mirror; and an off-axis parabolic mirror that receives the light beam from the collimating mirror and focuses the light beam to the sample holder.

In another aspect, the mirror system is configured to focus the light beam to a spot size on the sample that is positioned on the sample holder to less than one hundred micrometers.

In another aspect, a camera is positioned downstream from the sample holder to image a spot from the sample, and a control unit is configured to receive signals from the camera and adjust the sample holder based on the signals.

In another aspect, the sample holder is adjustable within six degrees of freedom to position the sample.

One aspect is directed to a reflectometer configured to test a sample. The reflectometer comprises a light source that emits a light beam along a light path. A detector is positioned downstream from the light source along the light path. A sample holder is configured to position the sample along the light path with the sample holder positioned along the light path between the light source and the detector. First optical elements are positioned along the light path between the light source and the sample holder. Second optical elements are positioned along the light path between the sample holder and the detector. One of the first optical elements comprises an off-axis parabolic mirror. The light source emits the light beam along a first section of the light path and the off-axis parabolic mirror directs the light beam along a second section of the light path with the first section and the second section being perpendicular.

In another aspect, the first optical elements comprises a collimating mirror configured to direct the light beam to the off-axis parabolic mirror parallel to an optical axis of the off-axis parabolic mirror.

In another aspect, the off-axis parabolic mirror comprises a focal axis that is aligned with a center of the sample holder.

In another aspect, the off-axis parabolic mirror comprises a focal point on a surface of the sample holder.

In another aspect, the light path between the light source and the sample holder is devoid of lenses.

In another aspect, a camera is positioned downstream from the sample holder to image a spot from the sample, and a control unit is configured to receive signals from the camera and adjust the sample holder based on the signals.

One aspect is directed to a method of measuring a reflectance of a sample. The method comprises: projecting a light beam from a light source; thereafter reflecting the light beam from a collimating mirror to an off-axis parabolic mirror; thereafter focusing the light from the off-axis parabolic mirror to a spot size that is less than one hundred micrometers on the sample that is mounted on a sample holder; and thereafter reflecting the light beam from the sample through one or more downstream optical elements to a detector.

In another aspect, the method further comprises reflecting the light beam from the collimating mirror parallel to an optical axis of the off-axis parabolic mirror.

In another aspect, projecting the light beam from a light source towards the mirror comprises: projecting the light beam from one of a plurality of different lasers; for each of the different lasers, adjusting a first mirror to one of a first angular position that directs the light beam to a first polarizing optical element to provide a first polarization to the light beam and a second angular position that directs the light beam to a second polarizing optical element to provide a second polarization to the light beam.

In another aspect, the method further comprises adjusting a second mirror to one of a first position and receiving the light beam from the first polarizing optical element and a second position and receiving the light beam from the second polarizing optical element, directing the light beam from the second mirror downstream along a single light path in both the first position and the second position.

In another aspect, projecting the light beam from one of the plurality of different lasers comprises projecting the light beam from one of a first laser at a first wavelength and a second laser at a second wavelength.

The features, functions and advantages that have been discussed can be achieved independently in various aspects or may be combined in yet other aspects, further details of which can be seen with reference to the following description and the drawings.

DETAILED DESCRIPTION

The application is directed to a reflectometer configured to test a sample. The reflectometer includes a light source that emits a light beam to the sample that is placed on a sample holder. The reflectometer focuses the light beam to a reduced spot size on the sample. The reflectometer is configured to view structure/defects in the sample using a detector that is downstream from the sample.

Figure 1:
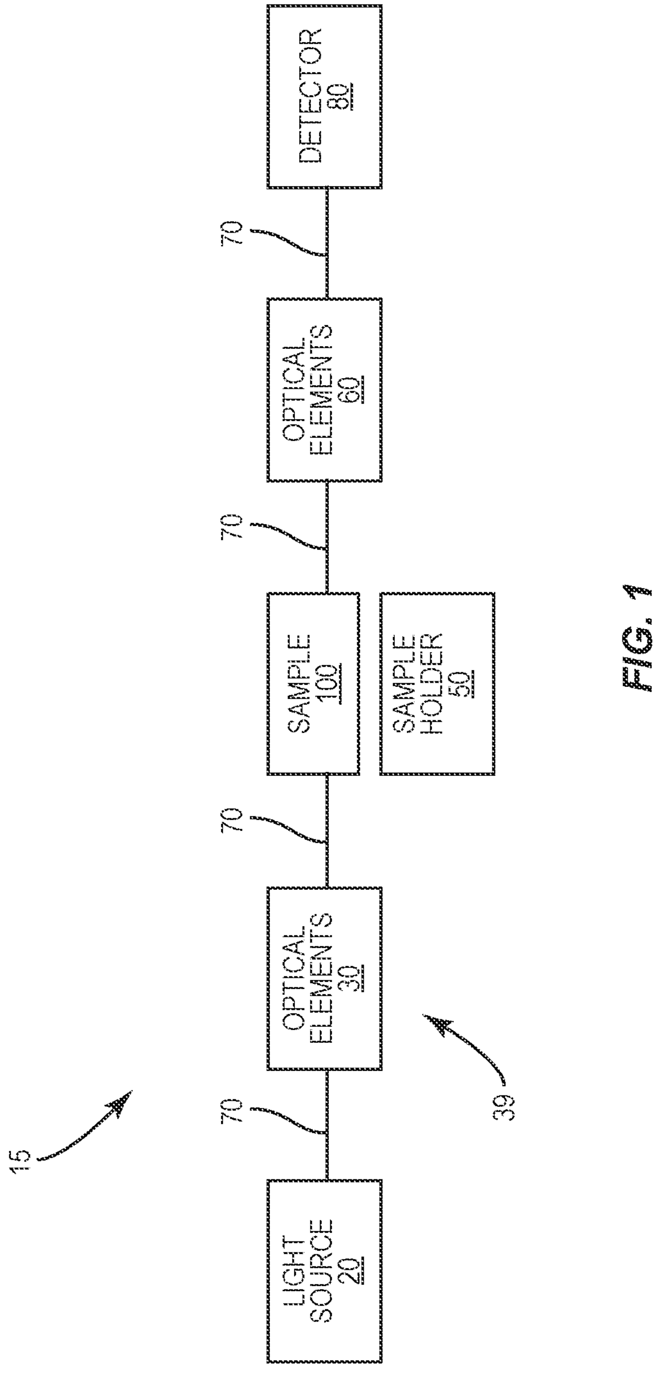
FIG. 1 is a schematic diagram of a reflectometer.

FIG. 1 illustrates a schematic diagram of a reflectometer 15 that is configured to test a sample 100. The reflectometer 15 includes a light source 20 that emits a light beam 70 along a light path. A sample holder 50 positions the sample 100 along the light path. A detector 80 positioned downstream receives the reflectance from the sample 100. One or more optical elements 30 are positioned along the light path upstream from the sample 100. One or more second optical elements 60 are positioned along the light path downstream from the sample 100.

The reflectometer 15 is configured to focus the light beam 70 onto the sample 100. In some examples, the reflectometer 15 focuses the light beam on the sample 100 to a spot size that is less than one hundred micrometers (100 μm).

The light source 20 is configured to emit the light beam. The light source 20 can be configured to emit a light within a variety of wavelengths. In some examples, the light source 20 is a laser that outputs a light beam within a range of between 6.5 μm-1550 nm. In some examples, the light source 20 is a quantum cascade laser (QCL) tunable to emit a light beam within a range of between 7 μm-12 μm. In some examples, the light source is a fixed wavelength laser. The light source 20 can include a variety of other configurations including but not limited to various lasers, light emitting diodes, broadband sources, light bulbs, and natural sun light.

The upstream optical elements 30 are positioned upstream from the sample 100 between the light source 20 and the sample holder 50. The downstream optical elements 60 are positioned downstream from the sample 100 between the sample holder 50 and the detector 80. The optical elements 30, 60 can include a variety of different elements including mirrors and lenses to shape and direct the light beam 70.

Figure 2:
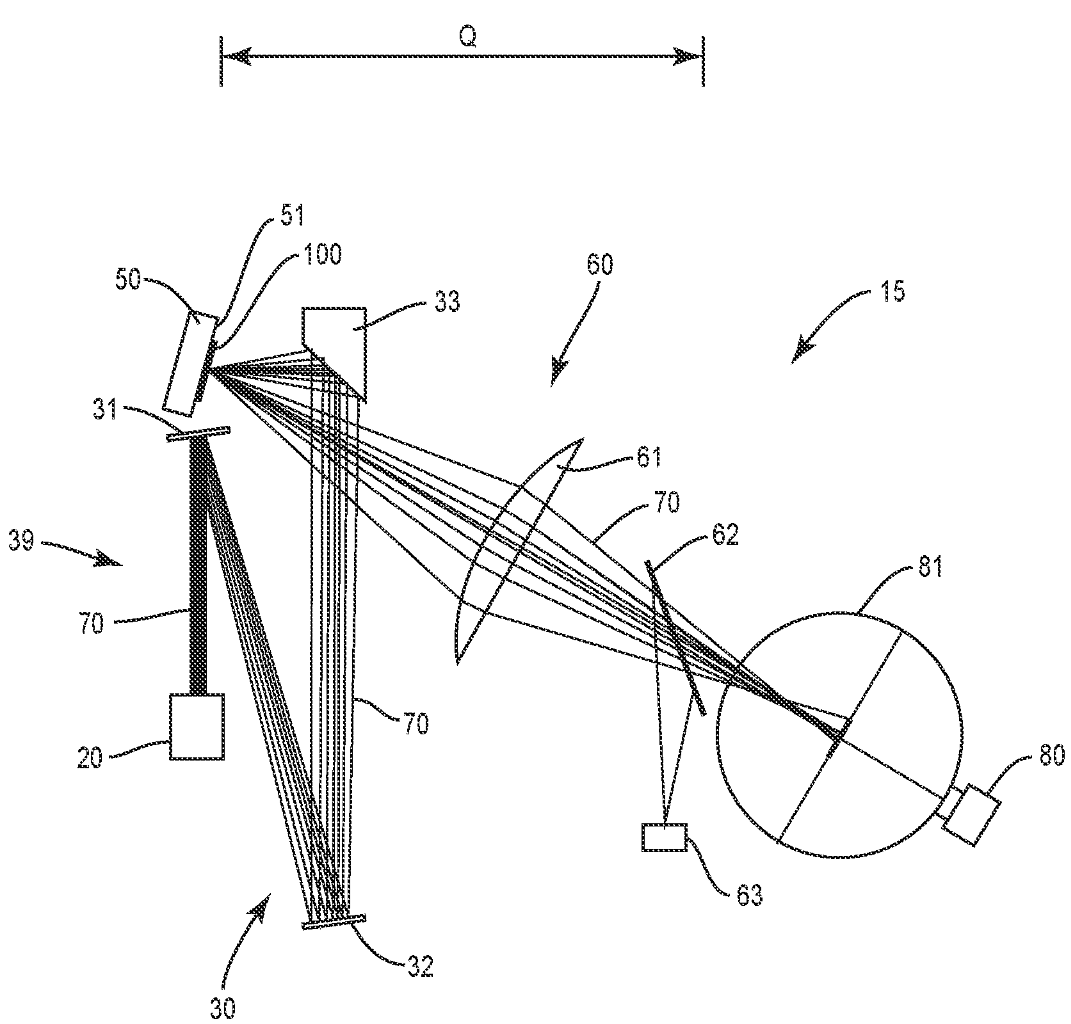
FIG. 2 is a schematic diagram of a reflectometer.

FIG. 2 illustrates an example of a reflectometer 15 that includes a light source 20, upstream optical elements 30, sample holder 50 to hold a sample 100, downstream optical elements 60, and detector 80. In this example, the upstream optical elements 30 include a mirror system 39 that includes reflective members that direct the light towards the sample 100. The reflective members reflect the light beam 70 without the light beam 70 passing through the optical elements 30. In some examples, the mirror system 39 is devoid of lenses.

As illustrated in FIG. 2, the mirror system 39 includes an expanding mirror 31 that reflects the light beam 70 emitted from the light source 20. The expanding mirror 31 causes the light rays of the light beam 70 to angle outward away from an optical axis of the light beam 70 as the light beam 70 is directed from the first mirror 31 to the second mirror 32.

In some examples, the second mirror 32 is a collimating mirror that causes the light rays of the light beam 70 to become more aligned as they move along the light path towards the third mirror 33. In some examples, the second mirror 32 causes the reflected rays to be parallel to an optical axis of the light beam 70 between the second mirror 32 and the third mirror 33.

Figure 3:
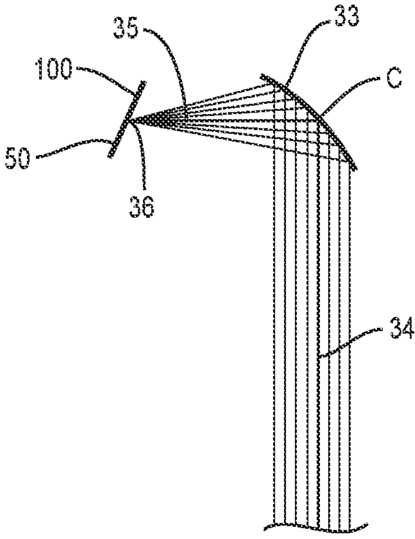
FIG. 3 is a schematic diagram of a portion of a light path within a reflectometer.

The third mirror 33 is positioned downstream from and receives the reflected light beam 70 from the second mirror 32. In some examples, the third mirror 33 is an off-axis parabolic (OAP) mirror. As illustrated in FIG. 3, the OAP mirror 33 has an optical axis 34 and a focal axis 35. The focal axis 35 passes between a center C of the OAP mirror 33 and a focal point 36 at the sample holder 50.

In some examples, the surface of the OAP mirror 33 is a section of a parent parabola. The optical axis 34 of the OAP mirror 33 is parallel to and offset from an optical axis of the parent parabola. The focal point 36 of the OAP mirror 33 is positioned on the optical axis of the parent parabola.

During use, the collimated light from the second mirror 32 is directed parallel to the optical axis 34 of the OAP mirror 33. This parallel arrangement provides for the OAP mirror 33 to reflect and focus the light at the focal point 36 which is offset from the optical axis 34. In some examples, the focal axis 35 is perpendicular to the optical axis 34. In some examples, the focal point 36 is positioned outward from a surface of the sample holder 50. The sample 100 is mounted on the surface of the sample holder 50 and positioned at the focal point 36 of the OAP mirror 33. In other examples, the focal point 36 is positioned on the surface of the sample holder 50. In the various examples, the focusing of the OAP mirror 33 results in a spot size less than 100 μm at the face of the sample 100.

Figure 4:
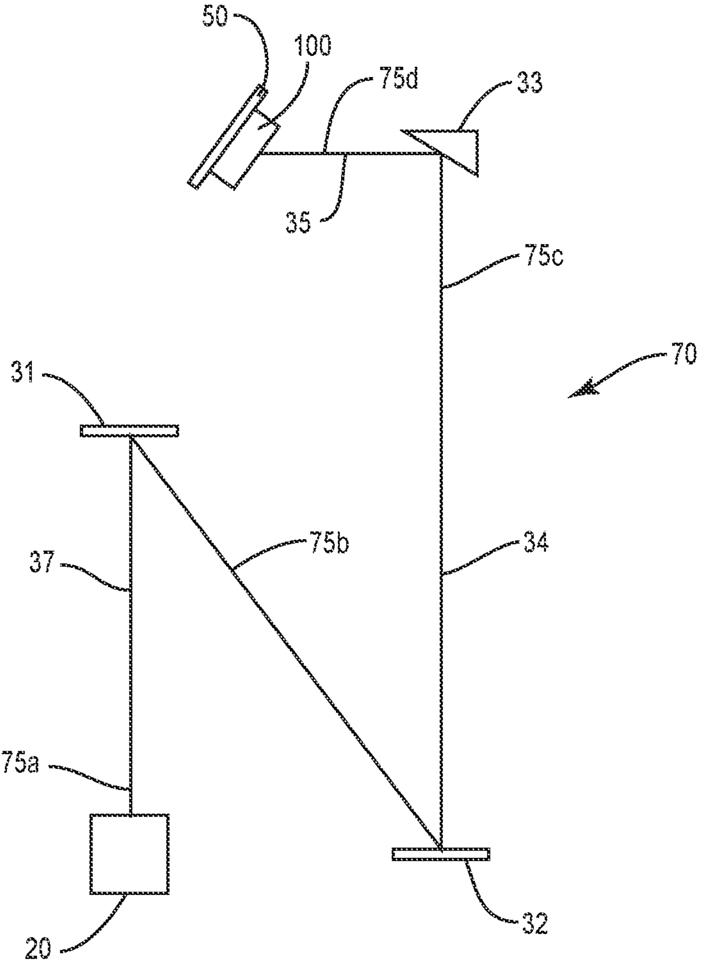
FIG. 4 is a schematic diagram of a portion of a light path within a reflectometer.

FIG. 4 illustrates a schematic diagram of the light path between the light source 20 and the sample 100 at the sample holder 50. The light path includes a first section 75*a* that includes an optical axis 37 between the light source 20 and the first mirror 31. A second section 75*b* extends between the first mirror 31 and the second mirror 32. A third section 75*c* includes the optical axis 34 that extends between the second mirror 32 and the third mirror 33. A fourth section 75*d* includes the focal axis 35 that extends between the third mirror 33 and the sample 100. In some examples, the optical axis 37 of the first section 75*a* and optical axis 34 of the third section 75*c* are parallel. In some examples, the focal axis 35 is perpendicular to the optical axis 37. In some examples, the focal axis 35 is perpendicular to the optical axis 34.

As illustrated in FIG. 2, the OAP mirror 33 directs the light away from the detector 80. This configuration provides for a smaller overall size of the reflectometer 15. In one example, a distance Q between the light source 20 and a camera 63 is 200 mm.

The sample holder 50 is configured to support the sample 100. The sample holder 50 includes a platform 51 on which the sample 100 is positioned during testing. In some examples, the platform 51 includes attachment members, such as but not limited to mechanical fasteners to secure the sample 100. The sample holder 50 is adjustable to move the platform 51 to provide for manipulating and aligning the focus spot. In some examples, the sample holder 50 provides for six degrees of freedom of movement to provide for adjustment for alignment of the focus spot.

Figure 5:
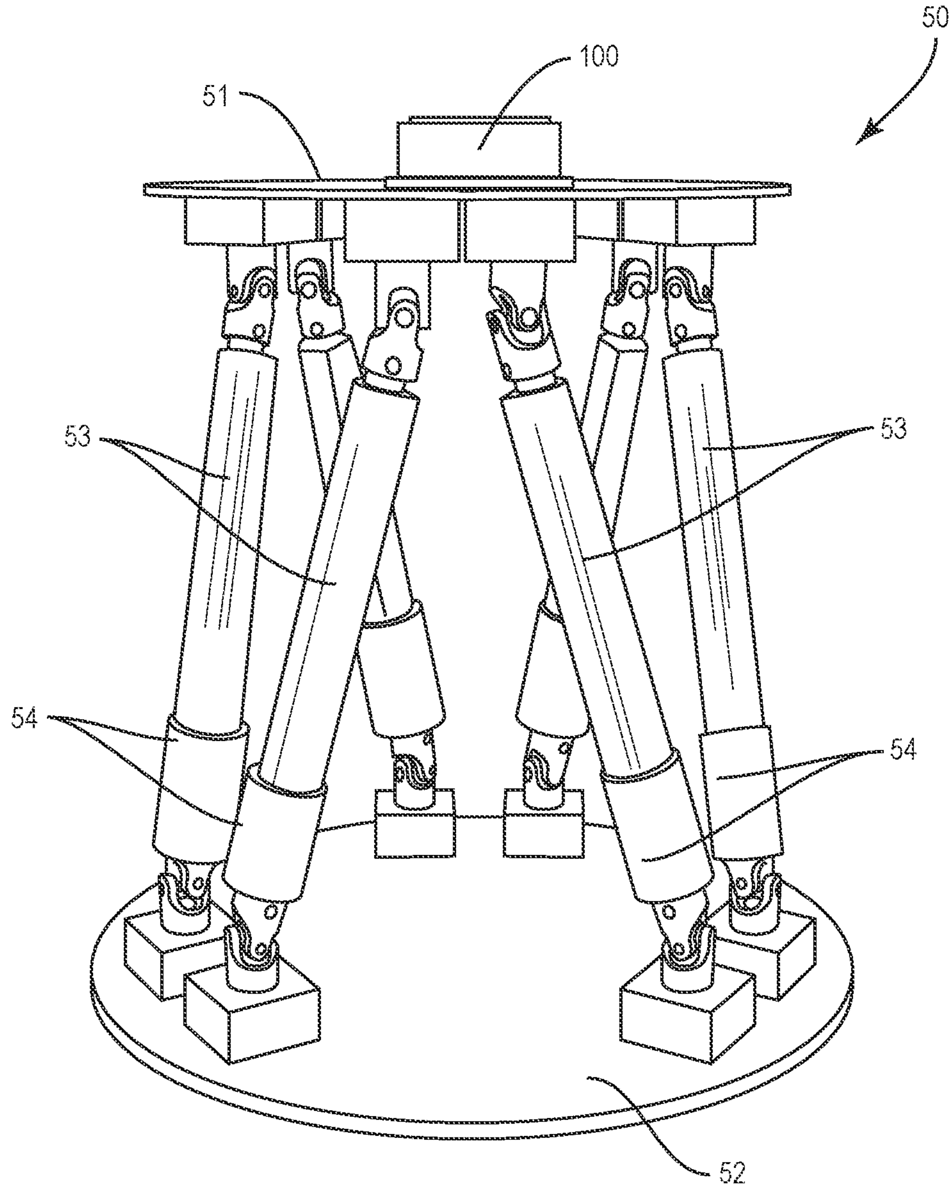
FIG. 5 is a perspective view of a sample holder that is supporting a sample.

FIG. 5 illustrates a sample holder 50 for positioning a sample 100. The sample holder 50 includes a platform 51 for positioning the sample 100. Legs 53 that extends upward from a base 52 support the platform 51. The legs 53 are adjustable to manipulate and position the platform 51. In some examples, the legs 53 are adjustable to provide for six degrees of freedom of movement of the platform 51 and thus the attached sample 100. One or more motors 54 provide for adjusting the legs 53.

As illustrated in FIG. 2, a camera 63 and mirror 62 provide for aligning the sample 100. The mirror 62 is a flip mirror that is moveable between a first position within the light path and a second position out of the light path. For alignment, the mirror 62 is flipped into the light path to direct light to the camera 63 which is otherwise located away from the light path. When the sample 100 is aligned, the mirror 62 is flipped out of the way to allow the light to be detected by the detector 80. The camera 63 detects the alignment of the sample and the focusing of the light on the sample 100. A control unit 90 receives signals from the camera 63 and detects the focus and the necessary changes to the sample holder 50. In some examples, the focusing is a completely automated process through the control unit 90. In other examples, one or more aspects of the system are manually operated (e.g., adjustment of the sample holder 50).

The downstream optical elements 60 include a collection lens 61. The collection lens 61 focuses the light beam towards the detector 80. The detector 80 captures the light from the sample 100. The detector 80 can include various different optical elements. The detector 80 can be configured to detect various different types of light depending upon the light source 20. Further, the detector 80 can detect light at various different polarizations including, but not limited to, vertical polarization, horizontal polarization, right-hand (RH) polarization, and/or left-hand (LH) polarization. In some examples as illustrated in FIG. 2, the detector 80 employs an integration sphere 81 with an imaging lens. In other examples, the detector 80 does not include an integration sphere 81.

Figure 6:
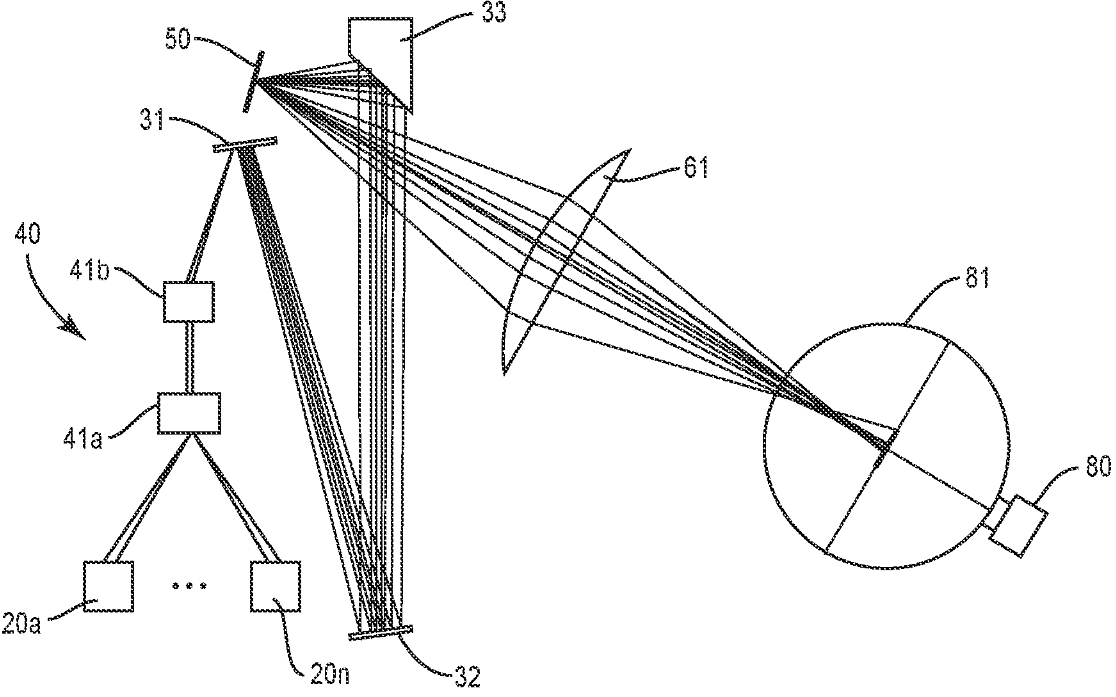
FIG. 6 is a schematic diagram of a reflectometer.

In some examples as illustrated in FIG. 2, the reflectometer 15 includes a single light source 20. In other examples as illustrated in FIG. 6, the reflectometer 15 includes two or more light sources 20*a*-20*n*. The different light sources 20*a*-20*n* emit light at different wavelengths or ranges of wavelengths. In one example, the reflectometer 15 includes four light sources 20 that each emit light at a different wavelength or range of wavelengths. In one specific example, the light sources 20 include: a first light source 20*a* that emits light within a range of wavelengths between 6.5 μm-13.3 μm; a second light source 20*b* that emits light within a range of wavelengths between 3.52 μm-5.11 μm; a third light source 20*c* that emits light at a wavelength of 1550 nm; and a fourth light source 20*d* that emits light at a wavelength of 1064 nm. In some examples, one or more of the light sources are tunable to adjust the wavelengths by 0.01 μm.

As illustrated in FIG. 6, a polarization control area 40 is positioned downstream from the light sources 20 and provides for selectively controlling the polarization of the light. The polarization control area 40 includes one or more optical elements 41 to control the polarization.

Figure 7:
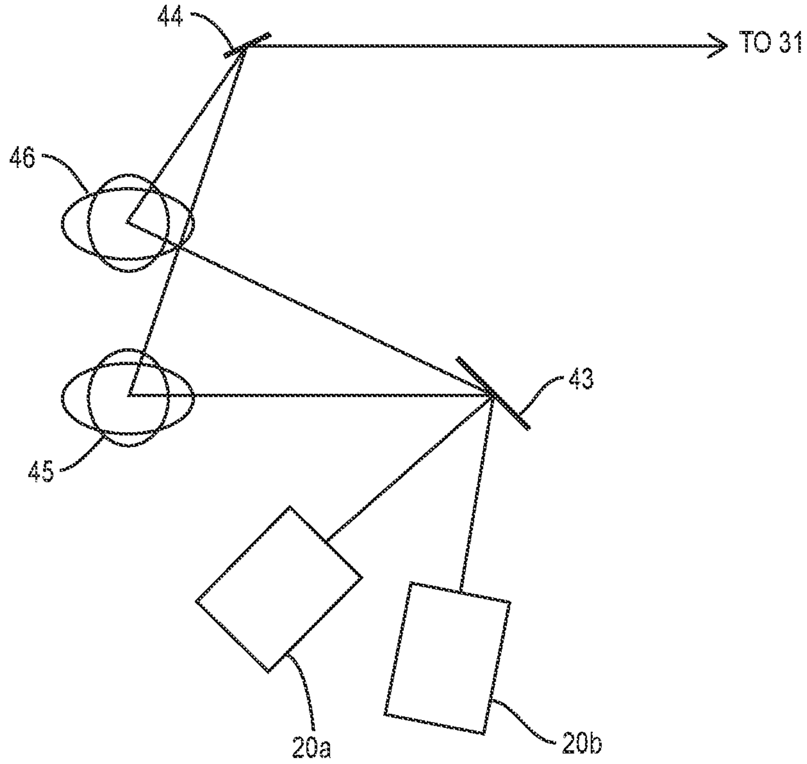
FIG. 7 is a schematic diagram of a portion of a light path within a reflectometer.

FIG. 7 illustrates an example that includes a pair of light sources 20*a*, 20*b* and a pair of mirrors 43, 44. In some examples, mirrors 43, 44 are each galvanometer mirrors. In other examples, one or both mirrors 43, 44 are different mirror types. The first mirror 43 is adjustable to move between different angular positions to receive light from either of the light sources 20*a*, 20*b*. The first mirror 43 directs the light to either a first optical element 45 or a second optical element 46. In some examples, the different optical elements 45, 46 provide for different polarizations. In one specific example, optical element 45 provides for S-polarization and optical element 46 provides for P-polarization. In one example, the optical elements 45, 46 are periscopes that uses one or more prisms, lens, or mirrors to reflect the light.

The second mirror 44 is configured to direct the light downstream to the first mirror 31. The second mirror 44 is positionable between a first position to receive light from optical element 45 and direct it to the first mirror 31, or to receive light from optical element 46 and direct it to the first mirror 31. The second mirror 44 functions to recombine the light paths such that both travel down the same light path to the first mirror 31. In one example with different polarizations, the second mirror 44 recombines the light paths such that both S and P polarization states travel down the same light path to the first mirror 31.

Figure 8:
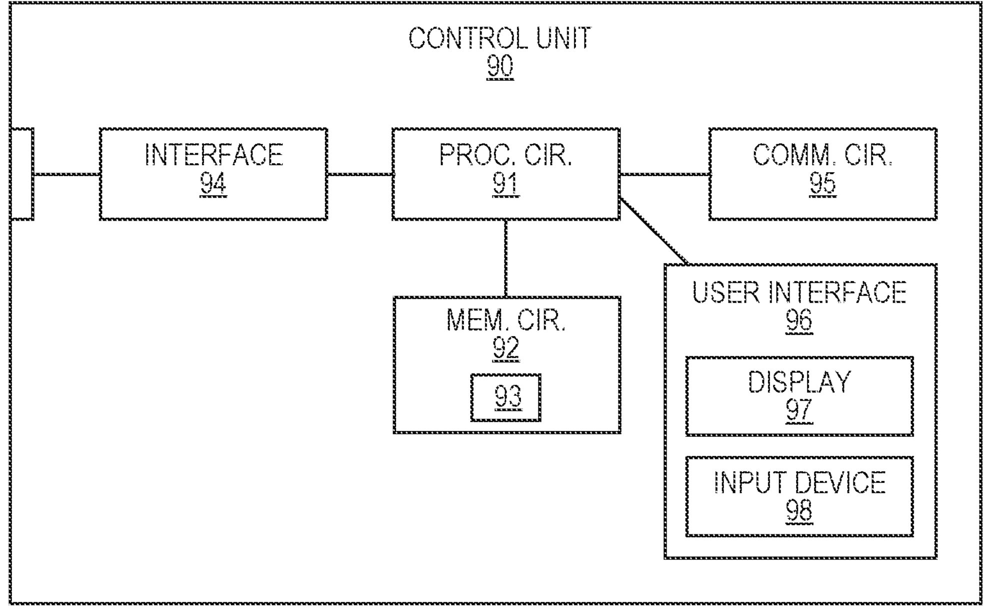
FIG. 8 is a schematic diagram of a control unit.

In some examples, the reflectometer 15 is computer controlled. As illustrated in FIG. 8, the reflectometer 15 includes a control unit 90 that oversees the operation. The control unit 90 includes processing circuitry 91 that operates according to program instructions 93 stored in memory circuitry 92. The processing circuitry 91 includes one or more circuits, microcontrollers, microprocessors, hardware, or a combination thereof. The processing circuitry 91 can include various amounts of computing power to provide for the needed functionality.

Memory circuitry 92 includes a non-transitory computer readable storage medium storing program instructions 93, such as a computer program product, that configures the processing circuitry 91 to implement one or more of the techniques discussed herein. Memory circuitry 92 can include various memory devices such as, for example, read-only memory, and flash memory. Memory circuitry 92 can be a separate component as illustrated in FIG. 8 or can be incorporated with the processing circuitry 91. Alternatively, the processing circuitry 91 can omit the memory circuitry 92, e.g., according to at least some embodiments in which the processing circuitry 91 is dedicated and non-programmable.

Interface circuitry 94 provides for sending and/or receiving signals from one or more of the components of the reflectometer 15. Components include but are not limited to motors that adjust the positioning of one or more of the optical elements 30, 60, motors 54 to adjust the sample holder 50, camera 63, and detector 80. The interface circuitry 94 can provide for one-way communications or two-way communications that are both to and from the components.

Communication circuitry 95 provides for communications to and from the control unit 90 with a remote node (e.g., operator equipment, server, database). Communications circuitry 95 provides for sending and receiving data with one or more remote nodes.

A user interface 96 provides for a user to control one or more aspects of the reflectometer 15 during operation. The user interface 96 includes one or more input devices 98 such as but not limited to a keypad, touchpad, roller ball, and joystick. The user interface 96 also includes one or more displays 97 for displaying information regarding the testing and/or for an operator to enter commands to the processing circuitry 91.

In some examples, the control unit 90 controls the full operation of the reflectometer 15. Additionally or alternatively, one or more of the components can be controlled by a user. In one example, the user is able to adjust the sample holder 50 according to output indicated on the display 97. In another example, the user inputs commands to control the type of light source 20 used during the testing.

Figure 9:
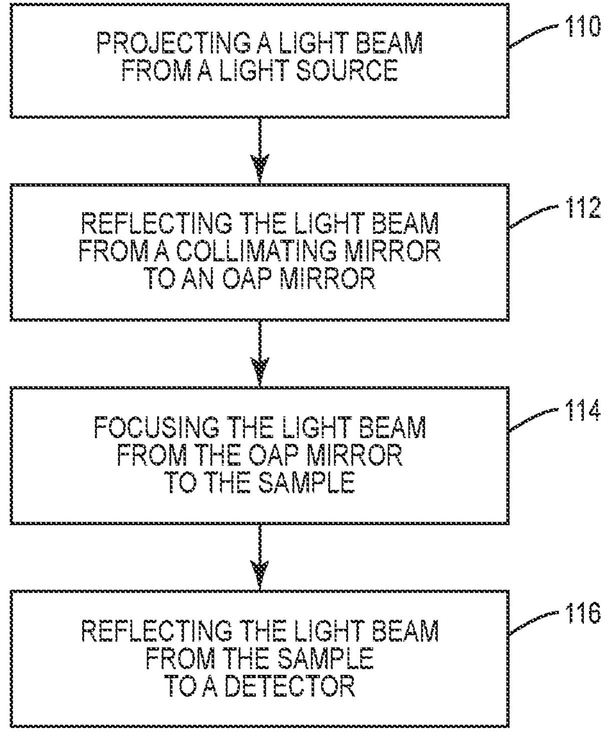
FIG. 9 is a flowchart diagram of a method of measuring a reflectance of a sample.

FIG. 9 illustrates a method of measuring a reflectance of a sample 100. A light beam is projected from a light source 20 (block 110). The light beam is reflected from a collimating mirror 32 to an off-axis parabolic mirror 33 (block 112). The light beam is focused from the off-axis parabolic mirror 33 to a spot size that is less than one hundred micrometers on the sample 100 that is mounted on a sample holder 50 (block 114). The method includes reflecting the light beam from the sample through one or more downstream optical elements 60 to a detector 80 (block 116).

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A reflectometer configured to test a sample, the reflectometer comprising:

a light source configured to emit a light beam along a light path;

a sample holder configured to position the sample along the light path;

a mirror system positioned in the light path between the light source and the sample holder, the mirror system configured to reflect the light beam from the light source towards the sample with the mirror system comprising:

a first mirror positioned along the light path between the light source and the sample holder, the first mirror directing the light beam away from the sample holder;

a second mirror positioned along the light path to receive the light beam directly from the first mirror, the second mirror positioned a greater distance away from the sample holder than the light source;

an off-axis parabolic mirror positioned between the second mirror and the sample holder, the off-axis parabolic mirror directs the light beam to the sample holder;

a detector positioned downstream from the sample holder to receive the light beam that is reflected from the sample;

an alignment mirror positioned between the sample holder and the detector, the alignment mirror movable between a first position within the light path to direct the light beam to a camera and a second position out of the light path to enable the light beam to be received at the detector;

wherein the sample holder receives the light beam from the off-axis parabolic mirror and directs the light beam away from the off-axis parabolic mirror and towards the detector.

2. The reflectometer of claim 1, further comprising:

a first periscope configured to provide the light beam from the light source with a first polarization state;

a second periscope configured to provide the light beam from the light source with a second polarization state.

3. The reflectometer of claim 2, further comprising:

the first periscope configured to change a polarization of the light beam from the light source to the first polarization state;

the second periscope configured to change the polarization of the light beam from the light source to the second polarization state.

4. The reflectometer of claim 1, wherein the light source is a laser that emits the light beam at a first wavelength.

5. The reflectometer of claim 1, wherein:

the first mirror is an expanding mirror;

the second mirror is a collimating mirror that receives the light beam from the expanding mirror; and the off-axis parabolic mirror receives the light beam from the collimating mirror and focuses the light beam to the sample holder.

6. The reflectometer of claim 1, wherein the off-axis parabolic mirror is configured to focus the light beam to a spot size on the sample that is positioned on the sample holder to less than one hundred micrometers.

7. The reflectometer of claim 1, further comprising:

a control unit configured to receive signals from the camera and adjust the sample holder based on the signals.

8. The reflectometer of claim 7, wherein the sample holder is adjustable within six degrees of freedom to position the sample.

9. A reflectometer configured to test a sample, the reflectometer comprising:

a light source that emits a light beam along a light path;

a detector positioned downstream from the light source along the light path;

a sample holder configured to position the sample along the light path, the sample holder positioned along the light path between the light source and the detector;

first optical elements positioned along the light path between the light source and the sample holder, the first optical elements comprising:

a first mirror that receives the light beam from the light source;

a second mirror that receives the light beam directly from the first mirror with the second mirror positioned a greater distance away from the sample holder than the light source;

an off-axis parabolic mirror positioned along the light path downstream from the second mirror and positioned in closer proximity to the sample holder than the second mirror;

second optical elements positioned along the light path between the sample holder and the detector;

wherein the second optical elements comprise an alignment mirror that is movable between a first position in the light path to direct the light beam to a camera that is positioned out of the light path and a second position out of the light path;

wherein the off-axis parabolic mirror directs the light beam to the sample holder;

wherein the sample holder directs the light beam towards the detector and away from the off-axis parabolic mirror.

10. The reflectometer of claim 9, wherein the second mirror comprises a collimating mirror configured to direct the light beam directly to the off-axis parabolic mirror parallel to an optical axis of the off-axis parabolic mirror.

11. The reflectometer of claim 10, wherein the off-axis parabolic mirror comprises a focal axis that is aligned with a center of the sample holder.

12. The reflectometer of claim 11, wherein the off-axis parabolic mirror comprises a focal point on a surface of the sample holder.

13. The reflectometer of claim 9, wherein the light path between the light source and the sample holder is devoid of lenses.

14. The reflectometer of claim 9, further comprising:

a control unit configured to receive signals from the camera and adjust the sample holder based on the signals.

15. A reflectometer configured to test a sample, the reflectometer comprising:

a light source that emits a light beam along a light path;

a detector positioned downstream from the light source along the light path;

a sample holder configured to position the sample along the light path, the sample holder positioned along the light path between the light source and the detector;

first optical elements positioned along the light path between the light source and the sample holder, the first optical elements comprising:

an expanding mirror that causes light rays of the light beam to angle outward away from an optical axis of the light beam, the expanding mirror directs the light rays away from the sample holder;

a collimating mirror downstream from the expanding mirror and that receives the light rays directly from the expanding mirror and that causes the light rays of the light beam to become more aligned along the light path, the collimating mirror positioned a greater distance away from the sample holder than the light source;

an off-axis parabolic mirror downstream from the collimating mirror that focuses the light onto the sample holder;

second optical elements positioned along the light path between the sample holder and the detector, the second optical elements comprising an alignment mirror that is movable between a first position in the light path to direct the light beam to a camera that is positioned out of the light path and a second position out of the light path;

wherein the light beam is directed from the sample holder away from the off-axis parabolic mirror and towards the detector.

16. The reflectometer of claim 15, wherein the expanding mirror receives the light beam directly from the light source.

17. The reflectometer of claim 16, wherein the collimating mirror receives the light beam directly from the expanding mirror.

18. The reflectometer of claim 15, wherein a first section of the light path between the light source and the expanding mirror is perpendicular to a second section of the light path between the off-axis parabolic mirror and the sample holder.

19. The reflectometer of claim 15, wherein the second optical elements comprise a collection lens that receives the light beam from the sample holder and focuses the light beam towards the detector.

20. The reflectometer of claim 15, wherein the expanding mirror is positioned closer to the sample holder than the off-axis parabolic mirror.

* * * * *